United States Patent
Lee et al.

(10) Patent No.: US 10,193,387 B2
(45) Date of Patent: Jan. 29, 2019

(54) WIRELESS POWER TRANSMISSION APPARATUS AND METHOD

(71) Applicant: LG ELECTRONICS INC., Seoul (KR)

(72) Inventors: Jaesung Lee, Seoul (KR); Jinmoo Park, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/123,836

(22) PCT Filed: Mar. 5, 2015

(86) PCT No.: PCT/KR2015/002147
§ 371 (c)(1),
(2) Date: Sep. 6, 2016

(87) PCT Pub. No.: WO2015/133843
PCT Pub. Date: Sep. 11, 2015

(65) Prior Publication Data
US 2017/0018965 A1 Jan. 19, 2017

Related U.S. Application Data

(60) Provisional application No. 61/949,258, filed on Mar. 7, 2014.

(51) Int. Cl.
*H02J 50/10* (2016.01)
*H02J 50/70* (2016.01)
(Continued)

(52) U.S. Cl.
CPC .............. *H02J 50/10* (2016.02); *H02J 7/025* (2013.01); *H02J 50/12* (2016.02); *H02J 50/60* (2016.02);
(Continued)

(58) Field of Classification Search
CPC ...................................................... H02J 50/10
(Continued)

(56) References Cited

U.S. PATENT DOCUMENTS

2011/0254377 A1  10/2011 Wildmer et al.
2012/0068548 A1   3/2012 Endo et al.
(Continued)

FOREIGN PATENT DOCUMENTS

KR  10-2014-0007273 A   1/2014
WO  WO 2013/081995 A2   6/2013

*Primary Examiner* — Rexford Barnie
*Assistant Examiner* — Joseph Inge
(74) *Attorney, Agent, or Firm* — Birch, Stewart, Kolasch & Birch, LLP (57) ABSTRACT

A wireless power transmission device is disclosed. The wireless power transmission device, which is a medium-power wireless power transmission device that transmits power to a low-power wireless power reception device or a medium-power wireless power reception device, includes: a power conversion unit that converts electrical energy to a power signal; and a communications and control unit that communicates with the wireless power reception device and controls power transfer, the power conversion unit including: an inverter that converts DC input to an AC waveform that drives a resonant circuit; a primary coil that creates a magnetic field; and a current sensor that monitors the current in the primary coil, wherein the inverter operates in a full-bridge mode that drives a plurality of bridges or in a half-bridge mode that drives a single bridge.

5 Claims, 8 Drawing Sheets

(51) Int. Cl.
*H02J 50/80* (2016.01)
*H02J 50/90* (2016.01)
*H02J 50/12* (2016.01)
*H02J 50/60* (2016.01)
*H02J 7/02* (2016.01)

(52) U.S. Cl.
CPC .............. *H02J 50/70* (2016.02); *H02J 50/80* (2016.02); *H02J 50/90* (2016.02)

(58) Field of Classification Search
USPC ........................................................ 307/104
See application file for complete search history.

(56) References Cited

U.S. PATENT DOCUMENTS

| | | | |
|---|---|---|---|
| 2012/0074899 A1* | 3/2012 | Tsai | H02J 5/005 320/108 |
| 2013/0033118 A1 | 2/2013 | Karalis et al. | |
| 2014/0009109 A1* | 1/2014 | Lee | H02J 17/00 320/108 |

* cited by examiner

(a) If medium-power receiver is detected

< 140khz >  < Initial frequency of 140 kHz or below and duty cycle control >

(b) Input waveforms applied during medium-power operation

< 40 % duty ratio >  < 80% phase shift >

[Figure 8]

(a) Input waveforms applied during
    initial operation with medium-power

< 40 % duty ratio >           < 80% phase shift >

(b) If low-power receiver is detected

< 80 % phase shift at 205 kHz >     < 140khz >

[Figure 9]

(a) Full-bridge mode using synchronous gate drivers (b) Half-bridge mode using synchronous gate drivers

[Figure 10]

(a) Full-bridge mode using four gate drivers (b) Half-bridge mode using four gate drivers

WIRELESS POWER TRANSMISSION APPARATUS AND METHOD

CROSS REFERENCE TO RELATED APPLICATIONS

This application is the National Phase of PCT International Application No. PCT/KR2015/002147, filed on Mar. 5, 2015, which claims priority under 35 U.S.C. 119(e) to U.S. Provisional Application No. 61/949,258, filed on Mar. 7, 2014, all of which are hereby expressly incorporated by reference into the present application.

TECHNICAL FIELD

The present invention relates to a wireless power transmission device and method, and more particularly, to a wireless power transmission device and method which support both a low-power reception device and a medium-power reception device and properly transmit low power or medium power to each power reception device.

BACKGROUND ART

Contactless wireless charging is an energy transfer method that electromagnetically transfers energy without wires, as opposed to the existing method that transmits energy through wires and uses it as a power source for electronics. Contactless wireless transmission methods include electromagnetic induction. Electromagnetic induction is a power transfer method in which a power transmission part produces a magnetic field in a power transmitting coil (primary coil), and in which a receiving coil (secondary coil) is placed in a position where a current can be induced.

DISCLOSURE

Technical Problem

Recently, electromagnetic inductive wireless charging devices for mobile devices—that is, wireless power transmission devices—are being developed. Notably, the WPC (Wireless Power Consortium) is working toward the standardization of wireless power transmission technology.

Recently-developed wireless charging systems support low-power transmission and reception up to about 5 W. However, with the recent trend towards larger mobile devices and higher battery capacity, there are problems with low-power charging, such as long charging times and low efficiency.

Technical Solution

The present invention has been made in an effort to solve the above-described technical problems, and one embodiment of the present invention provides a wireless power transmission device, which is a medium-power wireless power transmission device that transmits power to a low-power wireless power reception device or a medium-power wireless power reception device, the wireless power transmission device including: a power conversion unit that converts electrical energy to a power signal; and a communications and control unit that communicates with the wireless power reception device and controls power transfer, the power conversion unit including: an inverter that converts DC input to an AC waveform that drives a resonant circuit; a primary coil that creates a magnetic field; and a current sensor that monitors the current in the primary coil, wherein the inverter may operate in a full-bridge mode that drives a plurality of bridges or in a half-bridge mode that drives a single bridge, the initial operation mode may be set to the half-bridge mode, and if a detected wireless power reception device is the medium-power wireless power reception device, the communications and control unit may change the inverter operation mode from the half-bridge mode to the full-bridge mode upon receiving a first control error packet from the wireless power reception device.

In the wireless power transmission device according to the embodiment of the present invention, the control error packet may indicate a control error value that the power receiver calculates using a desired control point and an actual control point.

In the wireless power transmission device according to the embodiment of the present invention, when the inverter operation mode is changed from the half-bridge mode to the full-bridge mode, the operating frequency in the initial operation mode may be maintained, and the duty cycle may be changed.

In the wireless power transmission device according to the embodiment of the present invention, the wireless power transmission device may receive, from the wireless power reception device, version information indicating whether the wireless power reception device is a low-power wireless power reception device or a medium-power wireless power reception device, and the wireless power transmission device may decide the inverter operation mode based on the version information.

In the wireless power transmission device according to the embodiment of the present invention, the inverter may include a first bridge and a second bridge, the inverter may operate in the full-bridge mode if driving pulse signals are applied to the first bridge and the second bridge, and the inverter may operate in the half-bridge mode if a driving pulse signal is applied to the first bridge and no driving pulse signal is applied to the second bridge.

The present invention has been made in an effort to solve the above-described technical problems, and one embodiment of the present invention provides a wireless power transmission method including the steps of: discovering a wireless power reception device; identifying and configuring the wireless power reception device; negotiating power transmission and reception with the wireless power reception device if the wireless power reception device is a medium-power wireless power reception device; and transferring power to the wireless power reception device, wherein, if the initial operation mode of the inverter of the wireless power reception device is a half-bridge mode and the wireless power reception device is the medium-power wireless power reception device, the inverter operation mode may be changed from the half-bridge mode to a full-bridge mode upon receiving a first control error packet in the power transfer step.

In the wireless power transmission method according to the embodiment of the present invention, the control error packet may indicate a control error value that the power receiver calculates using a desired control point and an actual control point.

In the wireless power transmission method according to the embodiment of the present invention, when the inverter operation mode is changed from the half-bridge mode to the full-bridge mode, the operating frequency in the initial operation mode may be maintained, and the duty cycle may be changed.

In the wireless power transmission method according to the embodiment of the present invention, the step of identifying and configuring the wireless power reception device may further include: the step of receiving, from the wireless power reception device, version information indicating whether the wireless power reception device is a low-power wireless power reception device or a medium-power wireless power reception device; and the step of deciding the inverter operation mode based on the version information.

In the wireless power transmission method according to the embodiment of the present invention, the inverter may include a first bridge and a second bridge, the inverter may operate in the full-bridge mode if driving pulse signals are applied to the first bridge and the second bridge, and the inverter may operate in the half-bridge mode if a driving pulse signal is applied to the first bridge and no driving pulse signal is applied to the second bridge.

Advantageous Effects

A wireless power transmission device according to an embodiment of the present invention may supply medium-level power and perform higher capacity charging at a faster rate than low-level power supply.

Further, the wireless power transmission device according to the embodiment of the present invention may supply power according to capacity, depending on whether a reception device discovered for power transmission is a low-power reception device or a medium-power reception device.

Further, the wireless power transmission device according to the embodiment of the present invention may perform efficient power supply according to the power level by operating the inverter in a half-bridge mode when supplying low-level power and in a full-bridge mode when supplying medium-level power.

Further, the wireless power transmission device according to the embodiment of the present invention may prevent an overload on the reception device at the starting point of power transmission since the initial power mode is set to a half-bridge mode. Moreover, when the inverter operation mode is switched from the half-bridge mode to the full-bridge mode, the operating frequency may be maintained, and duty cycle control may be performed. In particular, it is possible to prevent sudden transfer of high energy, caused by the change to the full-bridge mode, by reducing the duty cycle, thereby allowing for stable power transmission.

Further, the wireless power transmission device according to the embodiment of the present invention may change the power transmission level for each reception device while minimizing changes to the previous operation mode, by identifying whether a reception device is a low power-level reception device or a medium power-level reception device in the identification & configuration step and changing the inverter operation mode if a first control error packet is received in the power transfer step.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The foregoing description sets forth numerous specific details to convey a thorough understanding of the invention. However, it will be apparent to one skilled in the art that the invention may be practiced without these specific details.

Most of the terms used herein are general terms that have been widely used in the technical art to which the present inventive concept pertains, but some terms are arbitrarily chosen by the applicant in some cases so that their meanings are explained in detail in the following description. Hence, the present invention should be understood with the intended meanings of the terms rather than their simple names and meanings.

Figure 1:
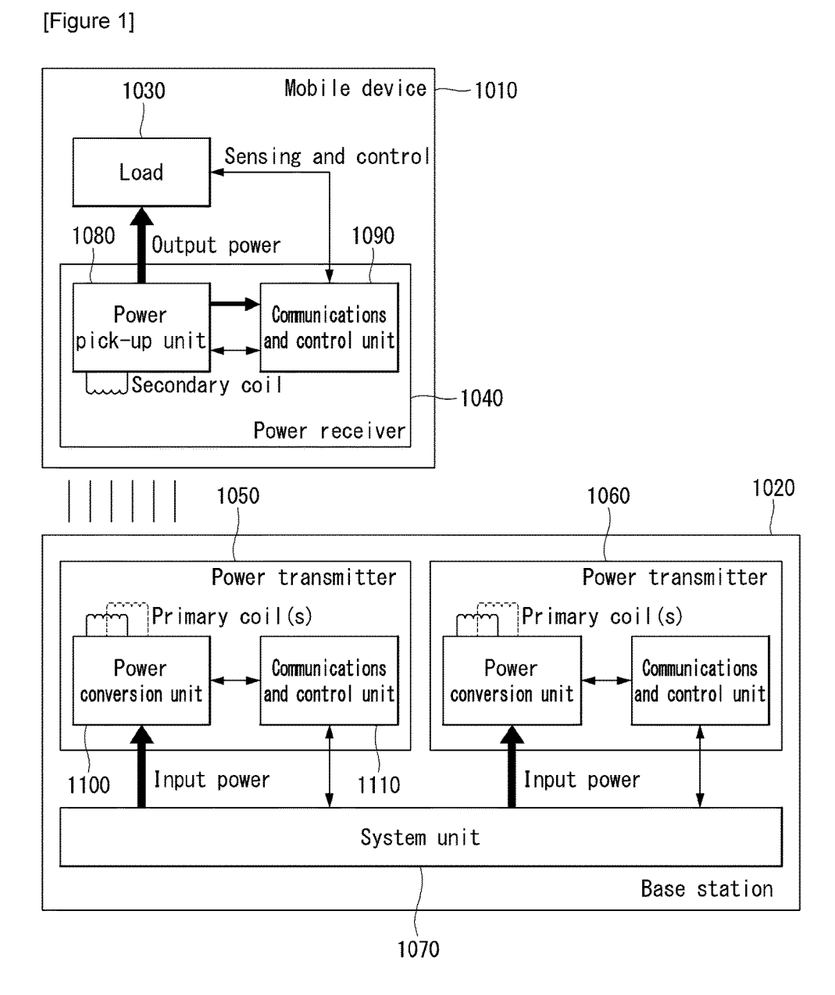
FIG. 1 shows a wireless power transmission/reception system according to an embodiment of the present invention.

FIG. 1 shows a wireless power transmission/reception system according to an embodiment of the present invention.

In FIG. 1, the wireless power transmission/reception system includes a mobile device 1010 that wirelessly receives power and a base station 1020.

The mobile device 1010 includes a power receiver 1040 that receives wireless power through a secondary coil and a load 1030 that gets the power received by the power receiver, stores it, and supplies it to the device. The power receiver 1040 may include a power pick-up unit 1080 that receives a wireless power signal through the secondary coil and converts it to electrical energy, and a communications and control unit 1090 that controls communications and power signal transmission/reception (power transfer/reception) between the power receiver 1040 and a power transmitter 1050.

The base station 1020 is a device that provides near-field inductive power, which may include one or multiple power transmitters 1050 and 1060 and a system unit 1070. The power transmitter 1050 transmits and controls inductive power. The power transmitter 1050 may include a power conversion unit 1100 that converts electrical energy to a power signal and transfers it by creating a magnetic field through primary coil(s), and a communications and control unit 1110 that controls communications and power transfer so that power is transferred at a level requested by the power receiver 1040. The system unit 1070 may perform other operational control of the base station, such as input power provisioning, control of multiple power transmitters, and user interfacing.

An operating point controlled by the power transmitter may correspond to a combination of frequency (phase), duty cycle, and voltage amplitude. The power receiver may control the transferred power by regulating at least one among frequency (phase), duty cycle/duty ratio, and input voltage.

In what follows, the power transmitters 1050 and 1060 may be referred to as (wireless) power transmission devices or transmitters, and the power receiver 1040 may be referred to as a (wireless) power reception device or receiver.

A power transmission/reception device may transmit and receive power at a given capacity/level. For example, power transmission levels may be divided into low-power transmission, medium-power transmission, high-power transmission, etc. In the present invention, wireless power transmission/reception of up to about 5 W may be referred to as low-power (level) transmission/reception, and wireless power transmission/reception of up to about 15 W may be referred to as medium-power (level) transmission/reception. In other words, a transmitter/receiver capable of transmitting and receiving wireless power up to about 5 W may be referred to as a low-power transmitter/low-power receiver, and a transmitter/receiver capable of transmitting and receiving wireless power up to about 15 W may be referred to as a medium-power transmitter/medium-power receiver. The present invention relates to a wireless power transmission device (i.e., medium-power transmitter) which supports medium power-level, and a target reception device includes both a low power-level reception device and a medium power-level reception device. Medium power means a power level higher than low power. In some embodiments, low power may correspond to 0 to 10 W, and medium power may correspond to 10 to 20 W.

In medium-power transmission/reception, there may be issues about compatibility with existing low-power transmission/reception devices. That is, there may be no significant problems with the use of medium-power receivers since low-power transmission device cannot provide medium power. However, if a low-power reception device interworks with a medium-power transmission device, malfunction or heating problems may occur due to the overcapacity of the low-power reception device.

Now, the operation of a medium-power transmission device capable of properly transferring power to a low-power reception device will be explained.

Figure 2:
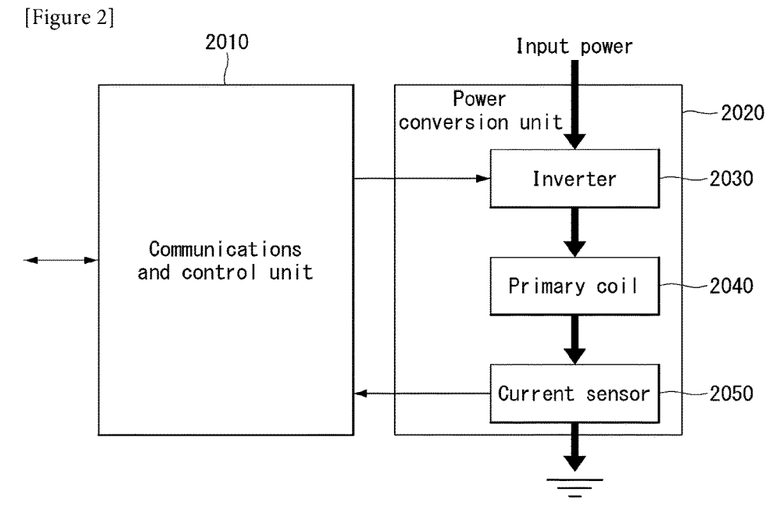
FIG. 2 is a view showing a power transmission device according to an embodiment of the present invention.

FIG. 2 is a view showing a power transmission device according to an embodiment of the present invention.

The power transmission device of FIG. 2 includes a control and communications unit 2010 and a power conversion unit 2020, as illustrated in FIG. 1. The communications and control unit 2010 may receive a message from a power reception device and decode it, execute a relevant power control algorithm and protocol, and drive an AC waveform's frequency to control power transfer. Also, FIG. 2 illustrates the power conversion unit 2020 in more detail.

In the embodiment of FIG. 2, the power conversion unit 2020 may include an inverter 2030 that converts DC input to an AC waveform that drives a resonant circuit, a primary coil 2040 that creates a magnetic field, and a current sensor 2050 that monitors the current in the primary coil.

In a wireless power transmitter of medium power (up to 15 W), the inverter may be a full-bridge inverter. However, if the power receiver is a low power-level (of up to 5 W), the transmitter uses a full-bridge inverter, which results in high amounts of stray voltage and current, causing the receiver's system to malfunction or break down. Accordingly, a transmission power control method is proposed in which the LC operation for a medium-power receiver is performed in a full-bridge mode and the LC operation for a low-power receiver is performed in a half-bridge mode, in order to allow for stable power transfer from the medium-power transmitter to the low-power receiver.

In the present invention, in order to detect a receiver, the transmitter operates in the half-bridge mode first while the receiver's power level is not known, and starts initial operation at a frequency which increases the gain at the receiving side. Once the receiver is identified as a medium-power receiver, the transmitter switches to the full-bridge mode after receiving a 1st control error packet, and, if necessary, the frequency is shifted to a low-gain frequency, thereby preventing application of excessive voltage to the secondary coil in the receiver.

The receiver may send its version information to the transmitter in an ID (identification) packet. Then, the transmitter maintain its LC operation method which has continued until the reception of the 1st control error packet, determines based on the version information whether the receiver is a low-power receiver or a medium-power receiver, and then switches to the corresponding inverter operation method or performs a frequency shift, thereby preventing the risk of applying a high voltage to the receiver.

Embodiments of a transmitting coil according to the present invention will be proposed below.

Figure 3:
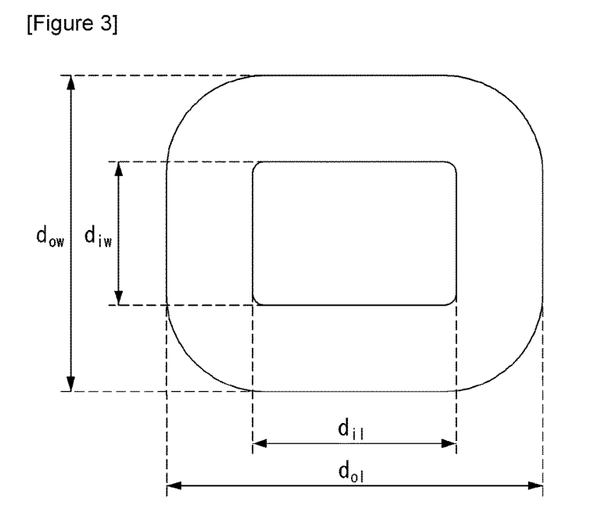
FIG. 3 shows a transmitting coil according to the present invention and its dimensions.

FIG. 3 shows a transmitting coil according to the present invention and its dimensions.

As shown in the coil of FIG. 3, $d_{ol}$ denotes outer length, $d_{il}$ denotes inner length, $do_w$ denotes outer width, and $d_{iw}$ denotes inner width. Two embodiments will be proposed below as a way of designing a transmitting coil, but the present invention is not limited to these embodiments.

First, the design dimensions of a transmitting coil according to a first embodiment of the present invention are as follows.

1 layer of coil with 11 turns which consists of D0.08 105 strands of Litz wire or equivalent wire Size: 51.0 mm in outer length, 43.0 mm in outer width, 27.5 mm in inner length, 19.5 mm in inner width Shape of Shield Material: a minimum 2.5 mm margin from the outer edge of the coil Thickness of shield material: a minimum of 1.5 mm Thickness of Coil and Shield Material Assembly: 3 mm or less Self Inductance (@1V, 100 kHz): 10.0 µH AC Resistance (@1V, 100 kHz): <60 mOhms The design dimensions of the coil according to the first embodiment will be summed up in the following Tables 1 and 2.

Table 1 shows parameters such as the size, thickness, number of turns, etc. of the transmitting coil.

TABLE 1

| Parameter | Symbol | Value |
|---|---|---|
| Outer length | $d_{ol}$ | 51.0 ± 0.5 mm |
| Inner length | $d_{il}$ | 27.5 ± 0.5 mm |
| Outer Width | $d_{ow}$ | 43.0 ± 0.5 mm |
| Inner Width | $d_{iw}$ | 19.5 ± 0.5 mm |
| Thickness | $d_c$ | 1.5 ± 0.5 mm |
| Number of Turns per Layer | N | 11 |
| Number of layers | — | 1 |

Table 2 shows the characteristics of the transmitting coil attached to the shield material.

TABLE 2

| Parameter | Symbol | Value |
|---|---|---|
| Self Inductance [@1 V, 100 kHz] | $L_S$ | 10.0 µH (±10%) |
| Distance from primary coil to interface surface of base station | $d_z$ | 3.0 ± 0.5 mm |

Next, the design dimensions of a transmitting coil according to a second embodiment of the present invention are as follows.

1 layer of coil with 12 turns which consists of D0.08 105 strands of Litz wire or equivalent wire Size: 50.0 mm in outer length (width), 20.0 mm in inner length (width)

Shape of Shield Material: a minimum 2.5 mm margin from the outer edge of the coil Thickness of shield material: a minimum of 1.5 mm Thickness of Coil and Shield Material Assembly: 3 mm or less Self Inductance (@1V, 100 kHz): 10.0 pH −AC Resistance (@1V, 100 kHz): <60 mOhms The design dimensions of the coil according to the second embodiment will be summed up in the following Tables 3.

Table 3 shows parameters such as the size, thickness, number of turns, etc. of the transmitting coil. In the second embodiment, however, the characteristics of the transmitting coil attached to the shield material are the same as the ones shown in Table 2.

TABLE 3

| Parameter | Symbol | Value |
|---|---|---|
| Outer length | $d_{ol}$ | 50.0 ± 0.5 mm |
| Inner length | $d_{il}$ | 20.0 ± 0.5 mm |
| Outer Width | $d_{ow}$ | 50.0 ± 0.5 mm |
| Inner Width | $d_{iw}$ | 20.0 ± 0.5 mm |
| Thickness | $d_c$ | 1.5 ± 0.5 mm |
| Number of Turns per Layer | N | 12 |
| Number of layers | — | 1 |

Figure 4:
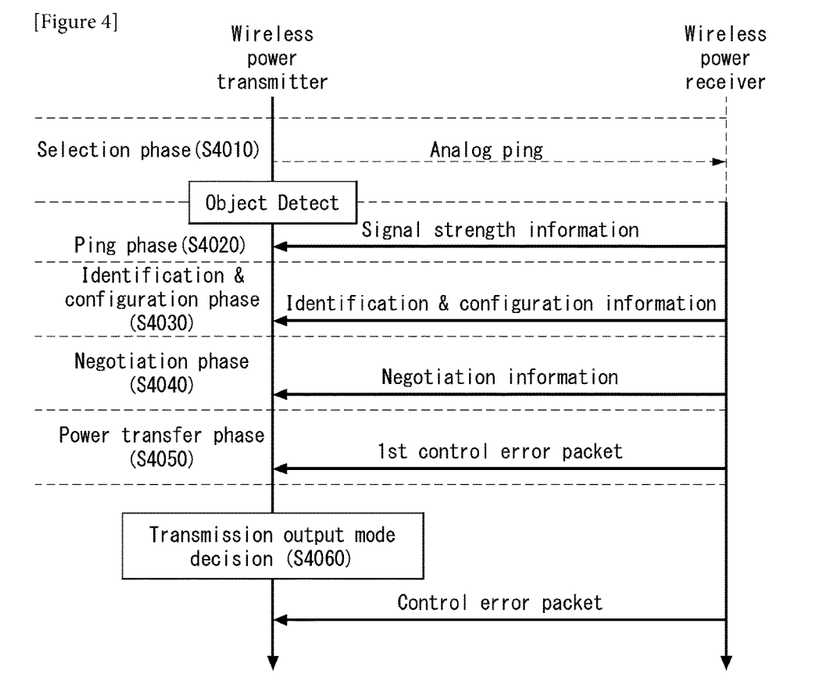
FIG. 4 is a flowchart showing a wireless power charging method according to an embodiment of the present invention.

FIG. 4 is a flowchart showing a wireless power charging method according to an embodiment of the present invention.

In a wireless charging system according to the present invention, wireless charging may be performed in five phases. The five phases include a selection phase S4010, a ping phase S4020, an identification & configuration phase S4030, a negotiation phase S4040, and a power transfer phase S4050. This will be explained below with reference to FIG. 4.

In the selection phase S4010, the power transmitter monitors the interface surface for the placement and removal of objects. As shown in FIG. 4, the wireless power transmitter may detect an object coming into contact by analog ping. In other words, the power transmitter may monitor the presence or absence of an object by applying a short pulse signal to the primary coil and detecting the current in the primary coil, generated by this pulse signal. If the power transmitter receives signal strength information (packet) monitored in the selection phase S4010 and detects an object based on this data, it may attempt to select whether this object is a power receiver or only a foreign object (like a key, coin, etc.). In order for the selection to work, the power transmitter may perform at least one among the ping phase S4020, identification & configuration phase S4030, and negotiation phase S4040.

In the ping phase S4020, the power transmitter may perform digital ping and wait for a response from the power receiver. Digital ping refers to the application/adaptation of a power signal in order to detect and identify a power receiver. If the power transmitter discovers a power receiver, the power transmitter may extend the digital ping to proceed to the identification & configuration phase S4030.

In the identification & configuration phase S4030, the power transmitter may identify the selected power receiver and obtain the power receiver's configuration information such as the maximum amount of power. In other words, the power transmitter may receive identification & configuration information and obtain information on the power receiver, and use this information to create a power transfer contract. This power transfer contract may include limits for several parameters that characterize the power transfer in the subsequent power transfer phase S4050.

In the negotiation phase S4040, the power receiver may negotiate with the power transmitter in order to generate an advanced power transfer contract. In other words, the power transmitter may receive a negotiation request/information from the power receiver, and, in an example, parameters such as the power transmitter's guaranteed power level and the power receiver's maximum power may be negotiated. The negotiation phase S4040 may be performed if the receiver is identified as a medium-power receiver. For example, if the Neg field of the configuration information/packet has a value of 1, the transmitter may proceed to the negotiation phase: otherwise, the transmitter may proceed to the power transfer phase without going through the negotiation phase and perform low-power transmission.

In the power transfer phase S4050, the power transmitter wirelessly provides power to the power receiver. The power transmitter may receive the power control data and control the power transfer based on the received control data. A violation of any of the limits on any of those parameters causes the power transmitter to abort the power transfer— returning the system to the selection phase S4010.

In the power transfer phase S4050, the power transmitter and the power receiver may control the amount of power that is transferred. More specifically, the power receiver selects a desired control point—a desired output current and/or voltage, a temperature measured somewhere in the mobile device, etc. In addition, the power receiver determines its actual control point. Using the desired control point and actual control point, the power receiver may calculate a control error value and transmit this control error value as a control error packet to the power transmitter. Then, the power transmitter may use the received control error packet to control the power transfer by setting and controlling a new operating point—amplitude, frequency, and duty cycle. Accordingly, the control error packet is sent and received at regular time intervals in the power transfer phase, and in an example, the power receiver may set the control error value to a negative number if it wants to decrease the current in the power transmitter and set the control error value to a positive number if it wants to increase the current in the power transmitter.

Notably, in the present invention, a transmission output mode decision phase S4060 is added. The power transmitter may receive version information indicating whether the receiver is a low-power mode receiver or a medium-power mode receiver, which is contained in the identification & configuration information. Accordingly, the power transmitter may find out whether a discovered power receiver is a low-power receiver or a medium-power receiver, based on the version information. If the power receiver is a medium-power receiver, the transmission output mode decision phase S4060 may be performed once the power transmitter receives a 1st control error packet. In this phase, the power transmitter may decide the power output mode. That is, in the transmission output mode decision phase S4060, the power transmitter may decide whether to maintain the LC operation mode at the half-bridge mode or switch it to the full-bridge mode, and then switch the LC operation mode.

In an example, if the wireless transmitter receives the 1st control error packet in the negotiation phase S4040, it may judge that the receiver operates in low-power mode (below 5 W), and maintain the power transfer mode at the half-bridge mode. If the wireless transmitter receives the 1st control error packet in the power transfer phase, it may terminate the negotiation phase in a normal way and switch the inverter operation method from the half-bridge mode to the full-bridge mode, based on the judgment in the negotiation phase that the receiver is a medium-power receiver.

Figure 5:
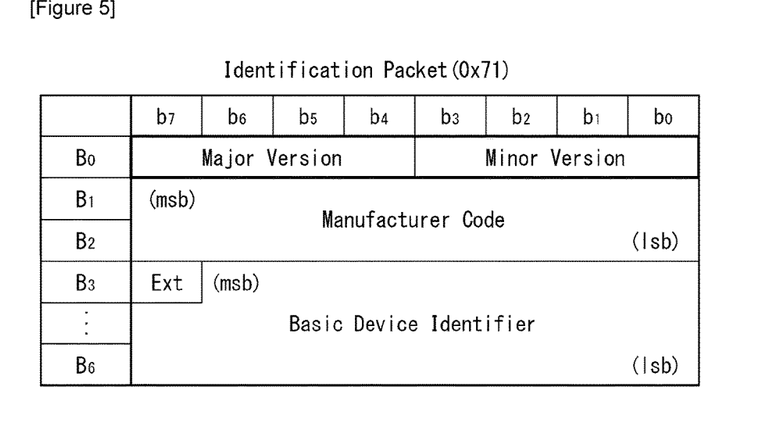
FIG. 5 shows identification & configuration information according to an embodiment of the present invention.

FIG. 5 shows identification & configuration information according to an embodiment of the present invention.

FIG. 5 shows an ID (identification) packet to be sent and received, a type of identification & configuration information explained with reference to FIG. 4.

The ID packet may be sent to the power transmitter from the power receiver in the identification & configuration phase. Descriptions of the fields contained in this packet are as follows:

Major Version field: The combination of this field and the Minor Version field identifies to which version and revision of the System Description Wireless Power Transfer the Power Receiver complies.

Minor Version field: The combination of this field and the Major Version field identifies to which version and revision of the System Description Wireless Power Transfer the Power Receiver complies.

Manufacturer Code field: identifies the manufacturer of the Power Receiver

Basic Device Identifier field: a field for identifying the Power Receiver. The combination of Basic Device Identifier and Manufacturer Code is unique.

In this specification, major version information and minor version information may be collectively referred to as version information. Based on the version information, the power transmitter may identify whether a discovered power receiver is a low-power receiver or a medium-power receiver. For example, a version lower than 2.0 may indicate a low-power receiver, and a version 2.0 or higher may indicate a medium-power receiver. Also, as described above, if the power transmitter receives the ID packet shown in FIG. 5 in the identification & configuration phase and then receives the 1st control error packet, it may judge whether the power receiver is a low-power receiver or a medium-power receiver, based on the version information in the ID packet.

Figure 6:
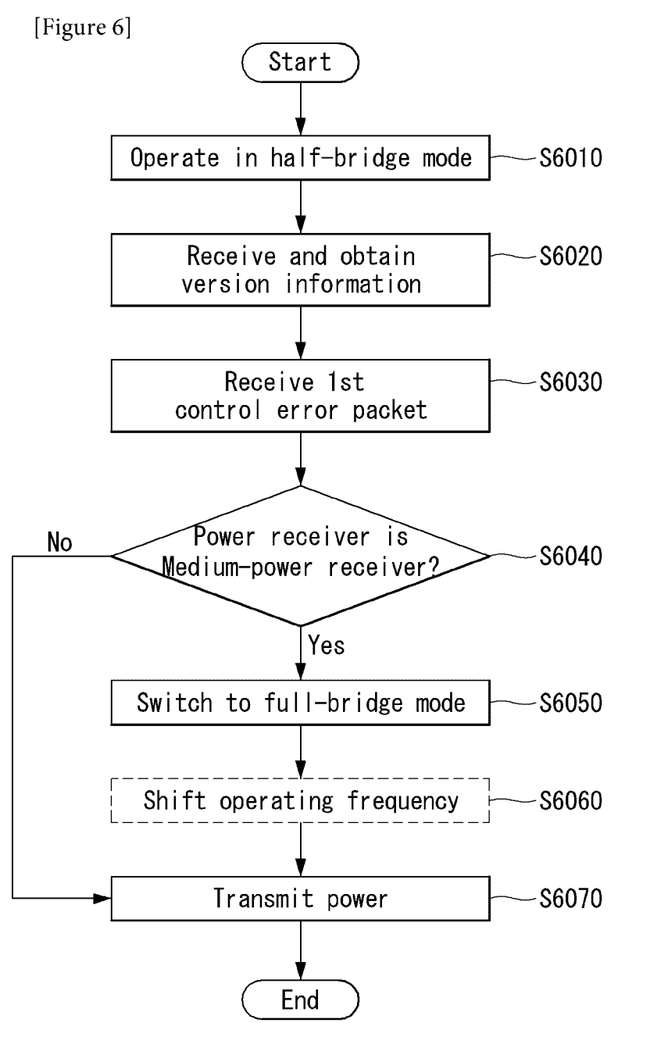
FIG. 6 shows a wireless power transmission method according to an embodiment of the present invention.

FIG. 6 shows a wireless power transmission method according to an embodiment of the present invention.

FIG. 6 is a sequence diagram showing a part of the flowchart in FIG. 4 which involves an embodiment of the present invention. This flow may work in conjunction with the part explained with reference to FIG. 4.

First, the power transmitter starts operating in the half-bridge mode (S6010). This is to transmit high power at the initial stage so as to prevent malfunction/breakdown in the case of a low-power receiver. In this present invention, the initial operation mode is set to the half-bridge mode.

The power transmitter may receive and obtain version information (S6020). As described above, the power transmitter may receive identification & configuration information in the identification & configuration phase, receive such an ID packet as shown in FIG. 5, and decode and parse this packet to obtain version information.

The power transmitter may receive a 1st control error packet (S6030), and judge whether the power receiver is a low-power receiver or a medium-power receiver based on the obtained version information (S6040). As described previously, in an example, if the version of the power receiver is 2.0 or higher, the power receiver may be judged to be a medium power-level receiver, or if the version is lower than 2.0, the power receiver may be judged to be a low power-level receiver. A receiver with its version number lower than 2.0 may be judged to be a low power-level receiver. For the low power-level receiver, the half-bridge mode operation may be maintained (S6040, No).

If the power receiver is judged to be a medium power-level receiver (S6040, Yes), the power transmitter may switch the inverter operation mode from the half-bridge mode to the full-bridge mode (S6050). A method of switching the inverter operation mode will be described again below. It is to be noted that, as explained with reference to FIG. 5, the type of the power receiver may be determined first, and that the inverter operation mode may be changed to the full-bridge mode upon receiving the 1st control error packet.

In addition, the power transmitter may shift the operating frequency (S6060). It is to be noted that, in an example, the power transmitter may control at least one among frequency (phase), duty cycle, or voltage amplitude in order to adjust the power transfer. Although FIG. 6 depicts an example of shifting the operating frequency, the following examples will be described with respect to a method of controlling the duty cycle while maintaining the operating frequency.

Finally, the power transmitter may transmit medium level-power at a set operating point (S6070).

The reasons why the inverter operation mode is switched upon receiving a control error packet are as follows. 1) If the receiver has sent a control error packet, the transmitter has to enter the power transfer phase. Accordingly, the identification and configuration information to be transmitted should indicate that the receiver is a medium-power receiver, and if the receiver sends a control error packet immediately, it means that "The receiver is a medium power-level receiver. Please transfer power with the charging performance indicated in the identification & configuration information sent from the receiver. I don't need the negotiation phase". In this case, if the transmitter supports power contract information in the received identification & configuration information, it may enter the power transfer mode for medium power; otherwise, it may enter the power transfer mode for low power. That is, even if a medium-power receiver is discovered, the power transfer may be performed without switching modes, but with less efficiency. 2) Also, the wireless power system according to the present invention may be configured such that voltage variation occurs only in the power transfer phase. The transmitter can vary voltage only when it receives a control error packet, but should not vary voltage for any other packets. This is to switch the power transfer level according to the present invention while maintaining compatibility with existing systems.

Although FIG. 6 illustrates a method of starting operation in the half-bridge mode, the operation may start at the low power level in the full-bridge mode. In this case, if the version of the power receiver is lower than 2.0 in the phase S6040, the operation may be switched to the half-bridge mode, similarly to FIG. 6.

Hereinafter, examples of a method of operating the inverter in the full-bridge mode and the half-bridge mode and switching the operation mode will be described The inverter is a unit that converts DC input to AC output. In the present invention, a full-bridge inverter may be provided, and the full-bridge inverter may operate in a full-bridge inverter mode and a half-bridge inverter mode. To this end, the inverter includes two bridges, and the half-bridge mode involves operating only one of the two bridges.

A plurality of drivers may be provided to operate the two bridges included in the inverter. The drivers operate the inverter by applying pulse width modulation (PWM) signals to switching devices (transistors) in the bridges. A first driver and a second driver are used for the full-bridge mode, and the input voltage may be controlled by applying a pulse signal to the first driver and an inverted signal of the first driver input signal or a phase-shifted pulse signal. In the half-bridge mode, the output amplitude may be reduced by grounding the second driver and operating the first driver only. Such a method of mode switching and operation of the inverter will be described in more detail with reference to the following embodiments.

Figure 7:
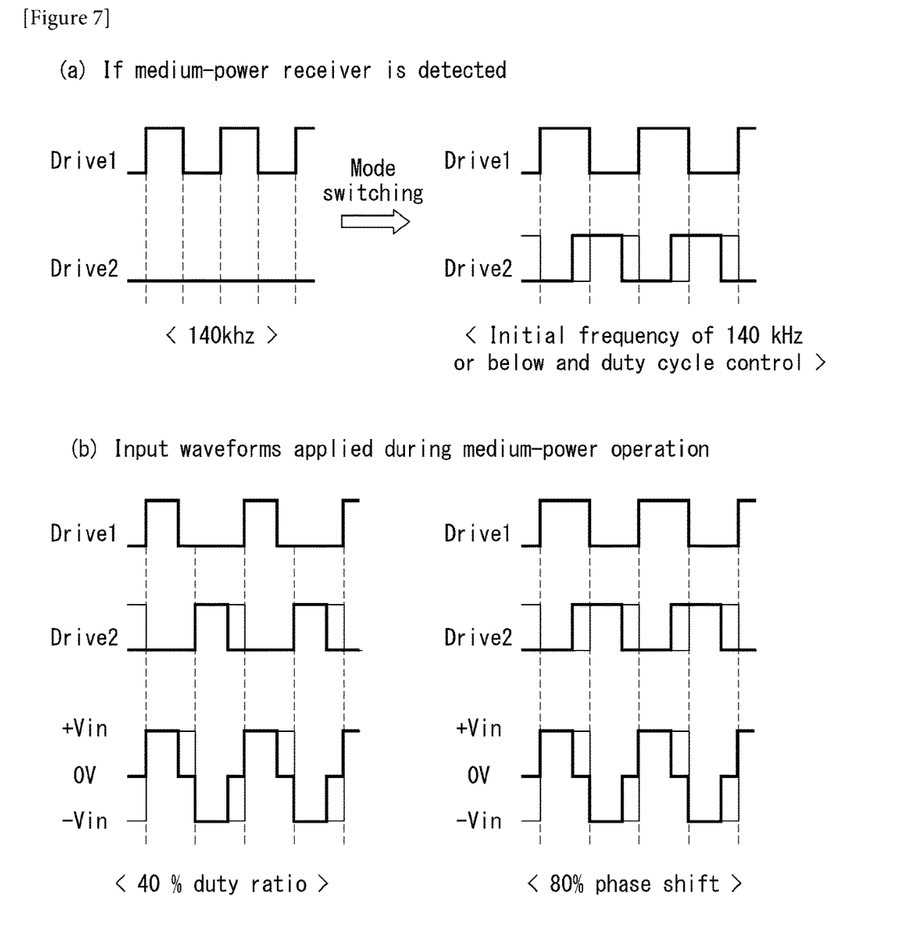
FIG. 7 is a view showing an inverter operation method according to an embodiment of the present invention.

FIG. 7 is a view showing an inverter operation method according to an embodiment of the present invention.

FIG. 7 shows the method of operating the inverter in the half-bridge mode and switching the operation mode to the full-bridge mode if a discovered power receiver is a medium-power receiver, as described above, and also shows the driving pulse signals. In the embodiment of FIG. 7, the initial driving frequency may be set to about 140 kHz (for example, 135~145 kHz), and if a medium-power receiver is detected, the operation mode may be switched to full-bridge, a driving frequency of about 140 kHz (for example, 135~145 kHz) or below may be used, and duty cycle control may be performed. In other words, when the inverter operation mode is switched to full-bridge, the operating frequency may be maintained, and the duty cycle may be changed. In this case, the duty cycle may be reduced to prevent sudden application of high energy caused by the full-bridge operation.

(a) of FIG. 7 shows the pulse signals that are applied to the first driver Drive 1 and second driver Drive 2 when the operation mode is switched from the half-bridge mode to the full-bridge mode. In the initial operation, the inverter may operate in the half-bridge mode by applying a pulse signal of 140 kHz to the first bridge of the first driver of a transmitter and grounding the second bridge. Also, if a medium-power receiver is detected, the inverter may operate in the full-bridge mode by applying a pulse signal of 140 kHz to the second bridge of the second driver as well. As described above, duty cycle control may be performed when the modes are switched.

(b) of FIG. 7 shows the driving pulse signals that are applied to the inverter while the inverter is operating in the full-bridge mode. In the medium-power operation, the duty cycle may be controlled to 40%, or the pulse signal for the second driver may be shifted 80% in phase. The driving pulse signals applied to the inverter as the results of these two methods may have the same waveform.

In an example, for receiver detection (digital ping), the frequency may be set to 140 kHz, and the duty cycle may be set to 50% or less. For power transfer, the frequency used in the half-bridge mode ranges from 110 kHz to 205 kHz and the duty cycle supported in the half-bridge mode is 50% to 10% at 205 kHz, and the frequency used in the full-bridge mode ranges from 110 kHz to 140 kHz and the duty cycle supported in the full-bridge mode is 50% to 5%.

Figure 8:
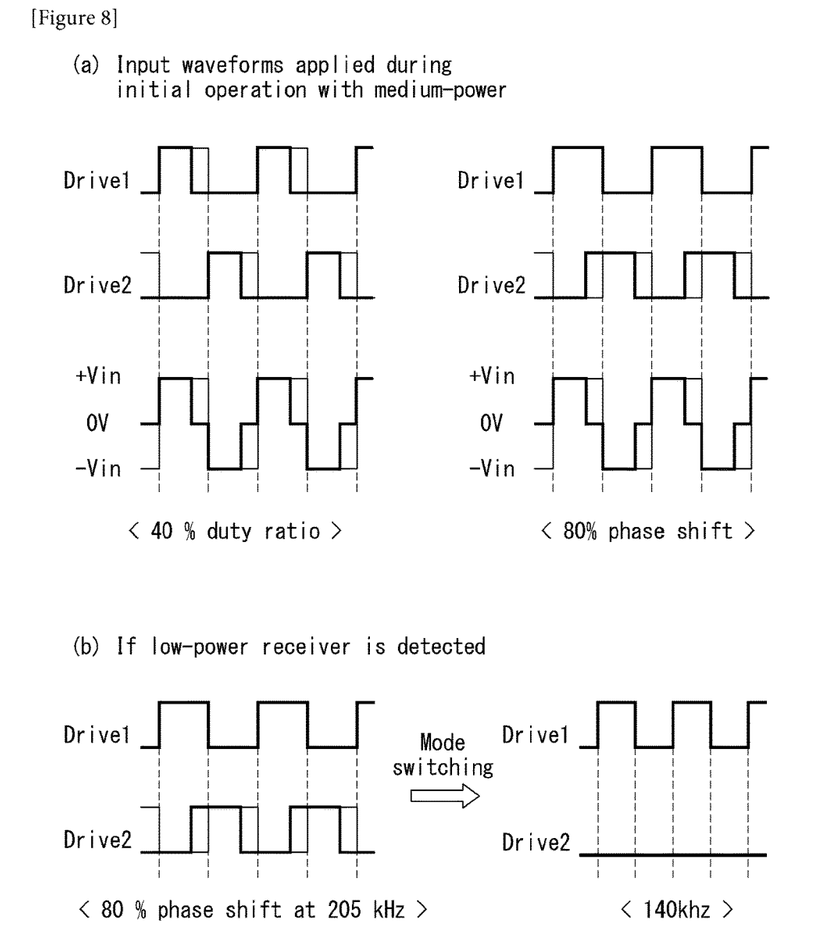
FIG. 8 is a view showing an inverter operation method according to another embodiment of the present invention.

FIG. 8 is a view showing an inverter operation method according to another embodiment of the present invention.

FIG. 8 shows the method of operating the inverter in the full-bridge mode and switching the operation mode from the full-bridge mode to the half-bridge mode if a discovered power receiver is a low-power receiver, as described above, and also shows the driving pulse signals. In the embodiment of FIG. 8, the initial driving frequency may be set to about 205 kHz, and if a low-power receiver is detected, the driving frequency may be changed to about 140 kHz (for example, 135~145 kHz) or below when the operation mode is switched to half-bridge.

(a) of FIG. 8 shows the driving pulse signals that are applied to the inverter while the inverter is initially operating in the full-bridge mode. In the medium-power operation, the duty cycle may be controlled to 40%, or the pulse signal for the second driver may be shifted 80% in phase. The driving pulse signals applied to the inverter as the results of the two methods may have the same waveform.

(b) of FIG. 8 shows the pulse signals that are applied to the first driver Drive 1 and second driver Drive 2 when the operation mode is switched from the full-bridge mode to the half-bridge mode. In the initial operation, the inverter may operate in the half-bridge mode by applying a pulse signal of 205 kHz to the first bridge of the first driver of a transmitter and applying an 80% phase-shifted pulse signal to the second bridge. Also, if a low-power receiver is detected, the inverter may operate in the half-bridge mode by grounding the second driver. Also, the operating frequency of the first driver may be changed to 140 kHz.

Figure 9:
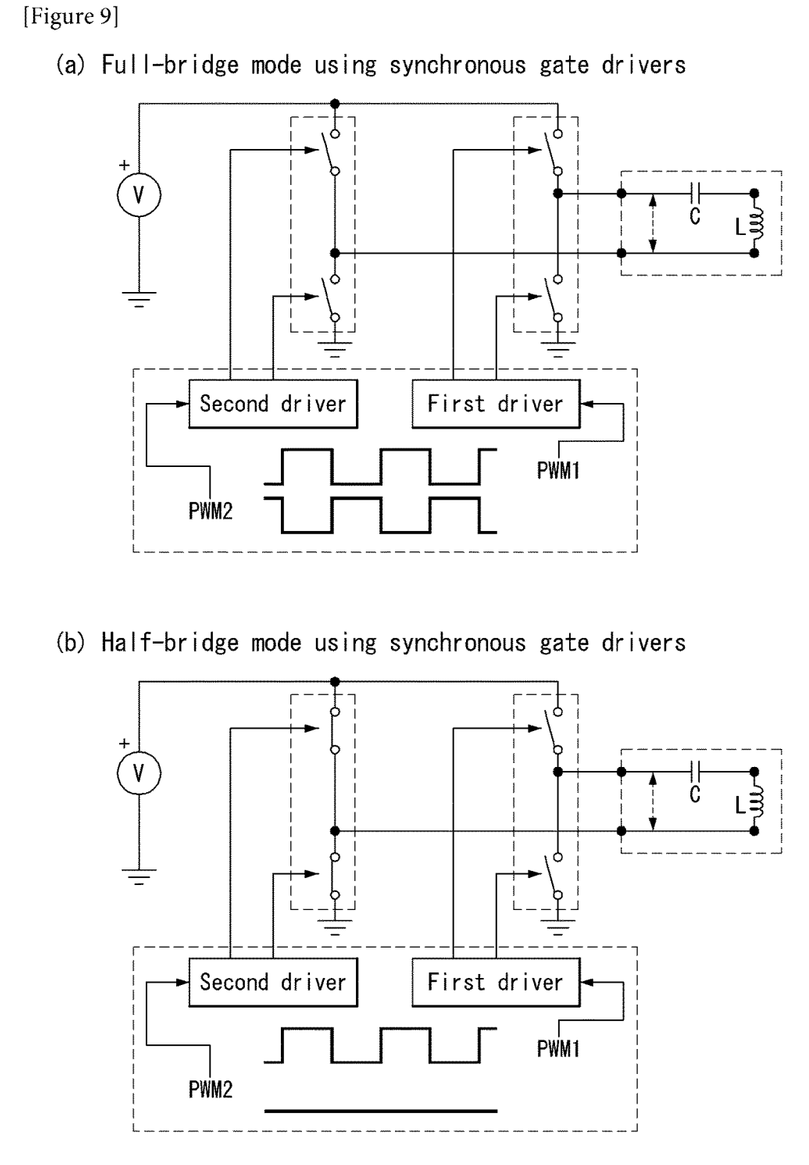
FIG. 9 is a view showing an inverter circuit and a method of changing the operation mode of the inverter circuit according to an embodiment of the present invention.

FIG. 9 is a view showing an inverter circuit and a method of changing the operation mode of the inverter circuit according to an embodiment of the present invention.

FIG. 9 shows switching of the operation mode of an inverter using synchronous gate drivers. A first synchronous gate driver (first driver) may drive the first bridge, and a second synchronous gate driver (second driver) may drive the second bridge.

If the inverter operates in the full-bridge mode as shown in (a) of FIG. 9, a first pulse signal PWM1 may be applied to the first driver to drive the first bridge, and a second pulse signal PWM2 may be applied to the second driver to drive the second bridge. In this case, the second pulse signal PWM2 may be generated as an inverted signal of the first driver input signal or a phase-shifted pulse signal.

If the inverter operates in the half-bridge mode as shown in (b) of FIG. 9, a first pulse signal PWM1 may be applied to the first driver to drive the first bridge, and a ground signal may be applied to the second bridge of the second driver. That is, the second bridge is grounded through the second driver so that only the first bridge operates and hence the inverter operates in the half-bridge mode.

Figure 10:
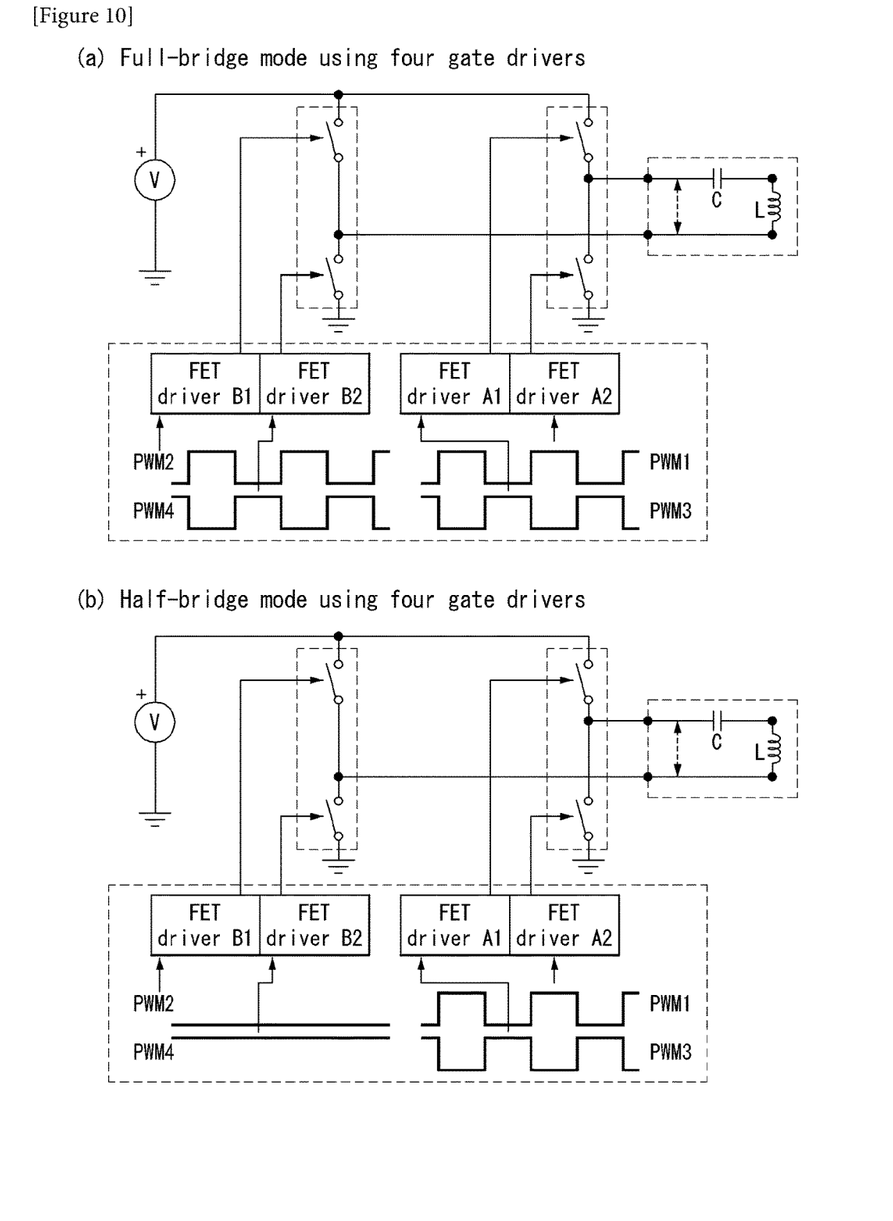
FIG. 10 is a view showing an inverter circuit and a method of changing the operation mode of the inverter circuit according to another embodiment of the present invention.

FIG. 10 is a view showing an inverter circuit and a method of changing the operation mode of the inverter circuit according to another embodiment of the present invention.

FIG. 10 shows an embodiment in which four gate drivers (FET drivers) are respectively connected to four switching devices included in an inverter. An FET driver A1 and an FET driver A2 are respectively connected to the switching devices in the first bridge of the inverter, and an FET driver B1 and an FET driver B2 are respectively connected to the switching devices in the second bridge.

When the inverter operates in the full-bridge mode as shown in (a) of FIG. 10, both the first and second bridges may be driven by applying a first pulse signal PWM1, second pulse signal PWM2, third pulse signal PWM3, and fourth pulse signal PWM4 to the four FET drivers, respectively. As illustrated therein, the third pulse signal PWM3 and the fourth pulse signal PWM4 may be generated by inverting or phase-shifting the first pulse signal PWM1 and the second pulse signal PWM2.

When the inverter operates in the half-bridge mode as shown in (b) of FIG. 10, only the first bridge may be driven by applying a first pulse signal PWM1 and a third pulse signal PWM3 to the FET drivers A1 and A2 that drive the first bridge, among the four FET drivers, applying a ground signal to the FET driver B1 that drives the second bridge, and applying a high signal to the FET driver B2. The third pulse signal PWM3 may be generated by inverting the first pulse signal PWM1.

It will be apparent to those skilled in the art that numerous modifications and variations can be made to the invention without departing from the spirit or scope of the present invention. Thus, the invention is intended to cover modifications and variations provided in the appended claims and their equivalent ranges.

Both the device and method inventions are mentioned herein, the description of both the device and method inventions can be complementary to each other.

MODE FOR CARRYING OUT THE INVENTION

Various embodiments have been described in the best mode for carrying out the present invention.

INDUSTRIAL APPLICABILITY

The present invention is used in a series of wireless charging technologies. It will be apparent to those skilled in the art that numerous modifications and variations can be made to the invention without departing from the spirit or scope of the present invention. Thus, the invention is intended to cover modifications and variations provided in the appended claims and their equivalent ranges.

The invention claimed is:

1. A wireless power transfer device, which is a medium-power wireless power transfer device that transfers power to a low-power wireless power reception device or a medium-power wireless power reception device, the wireless power transfer device comprising:

a power conversion unit that converts electrical energy to a power signal; and
a communications and control unit that communicates with the wireless power reception device and controls power transfer,
the power conversion unit comprising:
an inverter that converts DC input to an AC waveform that drives a resonant circuit;
a primary coil that generates a magnetic field;
a shield material aligned with the primary coil; and
a current sensor that monitors current in the primary coil,
wherein the primary coil has a rectangular shape with a single layer of which a number of turns is 12, and consists of 105 strands Litz wire of which the diameter is 0.08 mm,
wherein the shield material is at least 1.5 mm thick and extends at least 2.5 mm beyond the outside of the primary coil,
wherein the primary coil and the shield material have a self-inductance 10.0 µH, and
wherein the inverter operates in a full-bridge mode or in a half-bridge mode, the initial operation mode is set to the half-bridge mode, and if a detected wireless power reception device is the medium-power wireless power reception device, the communications and control unit changes the inverter operation mode from the half-bridge mode to the full-bridge mode alter receiving a control error packet from the wireless power reception device.

2. The wireless power transfer device of claim 1, wherein the control error packet indicates a control error value that the wireless power reception device calculates using a desired control point and an actual control point.

3. The wireless power transfer device of claim 1, wherein, when the inverter operation mode is changed from the half-bridge mode to the full-bridge mode, an operating frequency in the initial operation mode is maintained, and a duty cycle is changed.

4. The wireless power transfer device of claim 1, wherein the low-power wireless power reception device supports power reception of up to about 5 watt and the medium-power wireless power reception device supports power reception of up to about 15 watt.

5. The wireless power transfer device of claim 1, wherein the inverter comprises a first bridge and a second bridge, the inverter operates in the full-bridge mode if driving pulse signals are applied to the first bridge and the second bridge, and the inverter operates in the half-bridge mode if a driving pulse signal is applied to the first bridge and no driving pulse signal is applied to the second bridge.

* * * * *

UNITED STATES PATENT AND TRADEMARK OFFICE
CERTIFICATE OF CORRECTION

PATENT NO. : 10,193,387 B2
APPLICATION NO. : 15/123836
DATED : January 29, 2019
INVENTOR(S) : Jaesung Lee et al.

It is certified that error appears in the above-identified patent and that said Letters Patent is hereby corrected as shown below:

In the Specification

Column 7, Lines 14-15:
Change:
"1 layer of coil with 12 turns which consists of D0.08 105 strands of Litz wire or equivalent wire"
To:
--1 layer of coil with 12 turns, and consists of No. 17 AWG Litz wire having 105 strands of No. 40 AWG (0.08 mm diameter) or equivalent wire,--

In the Claims

Column 14, Lines 13-16, Claim 1:
Change:
"wherein the primary coil has a rectangular shape with a single layer of which a number of turns is 12, and consists of 105 strands Litz wire of which the diameter is 0.08 mm,"
To:
--wherein the primary coil has a rectangular shape with a single layer of which a number of turns is 12, and consists of a Litz wire having 105 strands of 0.08 mm diameter,--

Signed and Sealed this
Fifteenth Day of July, 2025

Coke Morgan Stewart
*Acting Director of the United States Patent and Trademark Office*